United States Patent [19]

Arakawa

[11] Patent Number: 5,489,837
[45] Date of Patent: Feb. 6, 1996

[54] AC-DC CONVERTER HAVING IMPROVED POWER FACTOR TO CONTROL FEEDBACK SIGNAL CORRESPONDING TO OUTPUT VOLTAGE OF CONSTANT CONTROL CIRCUIT

[75] Inventor: Koji Arakawa, Kawagoe, Japan

[73] Assignee: Toko, Inc., Tokyo, Japan

[21] Appl. No.: 134,391

[22] Filed: Oct. 12, 1993

[30] Foreign Application Priority Data

Oct. 16, 1992 [JP] Japan .................................. 4-304886

[51] Int. Cl.$^6$ .............................. G05F 5/00; H02M 3/156
[52] U.S. Cl. ..................... 323/207; 323/222; 323/299; 363/81; 363/89
[58] Field of Search ...................... 323/207, 222, 323/266, 281, 284, 299, 301; 363/80, 81, 89, 143; H02M 3/155, 3/156; G05F 5/00, 5/04

[56] References Cited

U.S. PATENT DOCUMENTS

| 4,691,159 | 9/1987 | Ahrens et al. | 323/222 |
| 5,289,361 | 2/1994 | Vinciarelli | 363/80 |
| 5,301,095 | 4/1994 | Teramoto et al. | 363/21 |
| 5,365,420 | 11/1994 | Cadman | 363/50 |

FOREIGN PATENT DOCUMENTS

0496529A2  7/1992  European Pat. Off. .

*Primary Examiner*—Peter S. Wong
*Assistant Examiner*—Adolf Berhane
*Attorney, Agent, or Firm*—Dressler, Goldsmith, Shore & Milnamow, Ltd.

[57] ABSTRACT

An AC-DC converter of a type having an improved power factor having an arrangement that enlargements of loads to be borne by circuit components due to AC input voltage is prevented so that the size and cost of the AC-DC converter are reduced. A constant-current circuit is, in parallel, connected to a voltage dividing point of charge voltage of an output capacitor to be connected to an input terminal of an error amplifier of a booster converter circuit and realized by a plurality of resistors so that control of a constant-current value of the constant-current circuit is performed with the rectified output from the rectifying circuit. As a result, the loads to be borne by the circuit components of the AC-DC converter can be made constant regardless of the supplied AC voltage level so that the size and cost of the AC-DC converter are reduced.

2 Claims, 3 Drawing Sheets

AC-DC CONVERTER HAVING IMPROVED POWER FACTOR TO CONTROL FEEDBACK SIGNAL CORRESPONDING TO OUTPUT VOLTAGE OF CONSTANT CONTROL CIRCUIT

BACKGROUND OF THE INVENTION

1. Field of the Invention

The present invention relates to an AC-DC converter of a type having an improved power factor to make load acting on components of a circuit thereof to be constant regardless of the level of supplied voltage.

2. Technical Background

A rectifying and smoothing circuit of a capacitor input type has been used for rectifying an AC input to be received by an AC-DC converter of a variety of electronic units. However, there arises a problem now in that harmonic distortion, which is generated in a commercial power supply line by an electronic unit that includes the rectifying and smoothing circuit of the capacitor input type, disorder the operations of other electronic units.

Accordingly, there arises a desire of obtaining an AC-DC converter of a type having an improved power factor that is free from the generation of the harmonic distortion. Therefore, AC-DC converters adapted to a variety of power factor improvement methods have been disclosed.

FIG. 4 illustrates an example of a circuit of a conventional AC-DC converter of a type having an improved power factor. The AC-DC converter shown in FIG. 4 is arranged in such a manner that an AC input terminal of a rectifying circuit 1 is connected to a commercial power supply line while interposing input terminals 9A and 9B, a DC output terminal of the rectifying circuit 1 is connected to an input terminal of a booster converter circuit 2b, an output terminal of the booster converter circuit 2b is connected to an input terminal of a DC-DC converter circuit 3, and an output terminal of the DC-DC converter circuit 3 is connected to an external load while interposing output terminals 10A and 10B.

The booster converter circuit 2b of the AC-DC converter shown in FIG. 4 has a circuit structured as follows.

A series circuit comprising a choke coil L1 and a diode D1 is connected to a position between an input terminal and an output terminal of the high potential side of the booster converter circuit 2b, the diode D1 making a direction from the choke coil L1 toward the output terminal to be a forward direction.

A main electric current passage of a switching transistor Q1 is connected to a position between the anode of the diode D1 and a low-potential-side line of the booster converter circuit 7.

An output capacitor C1 is connected to a position between the cathode of the diode D1 and a low-potential-side line.

A series circuit comprising resistors R3 and R4 is, in parallel, connected to the output capacitor C1.

A booster-converter control circuit 7 comprising an error amplifier 4, a pulse-width modulation circuit 5, a reference voltage circuit 6, resistors R1 and R2 is connected to a position between a voltage dividing point of the resistors R3 and R4 and the gate of the switching transistor Q1 so that the terminal voltage of the output capacitor C1 is controlled.

The booster-converter control circuit 7 is structured as follows.

A series circuit comprising the resistors R1 and R2 is connected to a position between an output terminal of the reference voltage circuit 6 and the low-potential-side line. A voltage dividing point of the resistors R1 and R2 is connected to a negative-side input terminal of the error amplifier 4.

A voltage dividing point of the resistors R3 and R4 is connected to a positive-side input terminal of the error amplifier 4.

An output terminal of the error amplifier 4 is connected to the pulse-width modulation circuit 5, and an output terminal of the pulse-width modulation circuit 5 is connected to the gate of the switching transistor Q1.

The waveform of input and output voltage to and from the booster converter circuit 2b structured as described above is as shown in FIG. 5.

Referring to FIG. 5, $V_{AC1}$, $V_{AC2}$ and $V_{AC3}$ are AC voltages having different levels, the AC voltages $V_{AC1}$, $V_{AC2}$ and $V_{AC3}$ being received by the AC-DC converter.

$V_{I1}$, $V_{I2}$ and $V_{I3}$ are voltages obtained by rectifying the AC voltages $V_{AC1}$, $V_{AC2}$ and $V_{AC3}$ by the rectifying circuit 1, the voltage $V_{I1}$, $V_{I2}$ and $V_{I3}$ being received by the booster converter circuit 2b.

$V_0$ is voltage transmitted from the booster converter circuit 2b, the voltage $V_0$ being, by the operation of the booster-converter control circuit 7, constant with respect to the supplied voltage.

AC voltage to be supplied to the AC-DC converter varies from 100 V to 240 V over the world. In order to be adaptable to the various AC voltage levels, the terminal voltage of the output capacitor C1 of the booster converter circuit 2b has generally been controlled to a level higher than the rectification peak level of the highest AC voltage by tens of volts, for example, to about 380 V.

When a consideration is made that the quantity of electric power to be processed by the booster converter circuit 2b is divided into converted power to be stored and simple transmission power, the converted power to be stored is expressed by the following equation:

$$P=(V_0-V_1)I_0 \tag{1}$$

where P is converted power to be stored, $V_0$ is output voltage, $V_1$ is supplied voltage and $I_0$ is transmitted electric current.

As can be understood from Equation (1), the converted power P to be stored is enlarged in proportion to the difference between the supplied voltage $V_1$ and the output voltage $V_0$. The enlargement of the converted power P to be stored makes the load to be borne by the components of the booster converter circuit 2b to be heavier. As a result, the size of each element must be increased and the heating value is inevitably enlarged.

When a circuit is designed, the terminal voltage of the output capacitor C1 must be set to a level which is, by tens of volts, higher than the peak value of rectification of the highest AC voltage and circuit elements must be selected while assuming that the circuit is driven with the lowest AC voltage. Therefore, a problem arises in that the size and cost of an AC-DC converter of the type having the improved power factor cannot be reduced.

It should be noted that the voltage $V_1$ to be supplied to the booster converter circuit 2b is treated as DC voltage for easy understanding although it is in a pulsating waveform obtained by rectifying the AC supplied voltage. The booster converter circuit 2b is also called a power-factor-improved active filter which performs a power factor improving operation, the description of which is omitted here because it has been described in detail in known documents. Further, a triangle wave oscillation circuit to be connected to the pulse-width modulation circuit 5 is omitted from FIG. 5.

The foregoing facts are also applied to the description of the embodiments of the present invention to be made later.

SUMMARY OF THE INVENTION

Accordingly, the present invention is directed to overcome the foregoing problems, and therefore, an object of the present invention is to prevent enlargement of loads to be borne by circuit components caused due to AC input voltage to be received by an AC-DC converter and to reduce the size and the cost of the AC-DC converter.

In order to achieve the foregoing object, according to the present invention, there is provided an AC-DC converter having a booster converter connected to a rectifying circuit to be connected to a commercial power supply line and arranged in such a manner that a constant-current circuit is disposed between either input terminal of an error amplifier of the booster converter circuit and a low-potential-side line, the error amplifier being arranged to subject, to a comparison, voltage corresponding to the voltage between terminals of an output capacitor and voltage corresponding to the reference voltage, and to transmit a signal for maintaining the voltage between terminals of the output capacitor at a constant level, and control of a constant-current value of the constant-current circuit is performed with the rectified output voltage from the rectifying circuit.

Other and further objects, features and advantages of the invention will be appear more fully from the following description.

DESCRIPTION OF THE PREFERRED EMBODIMENTS

Figure 1:
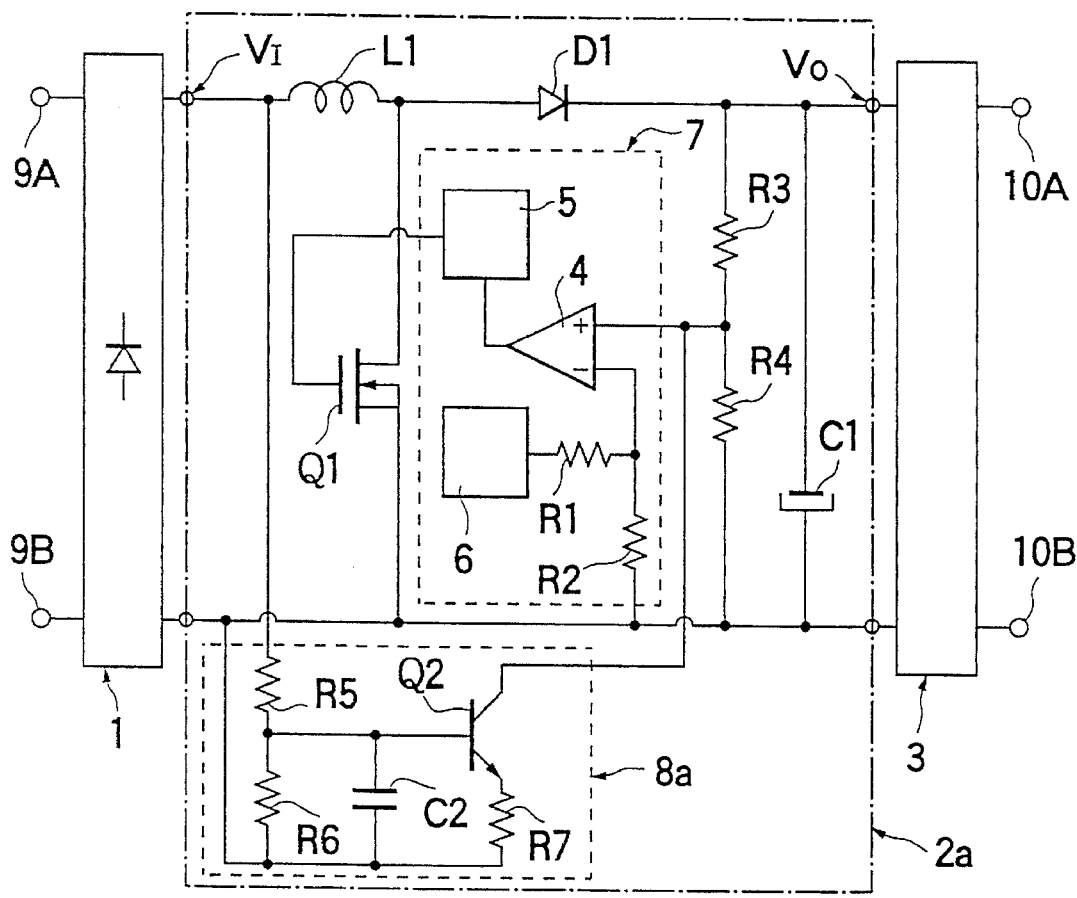
FIG. 1 illustrates a circuit for use in an AC-DC converter according to an embodiment of the present invention.

FIG. 1 illustrates an embodiment of an AC-DC converter according to the present invention. It should be noted that the same elements as those shown in FIG. 4 are given the same reference numerals.

Figure 4:
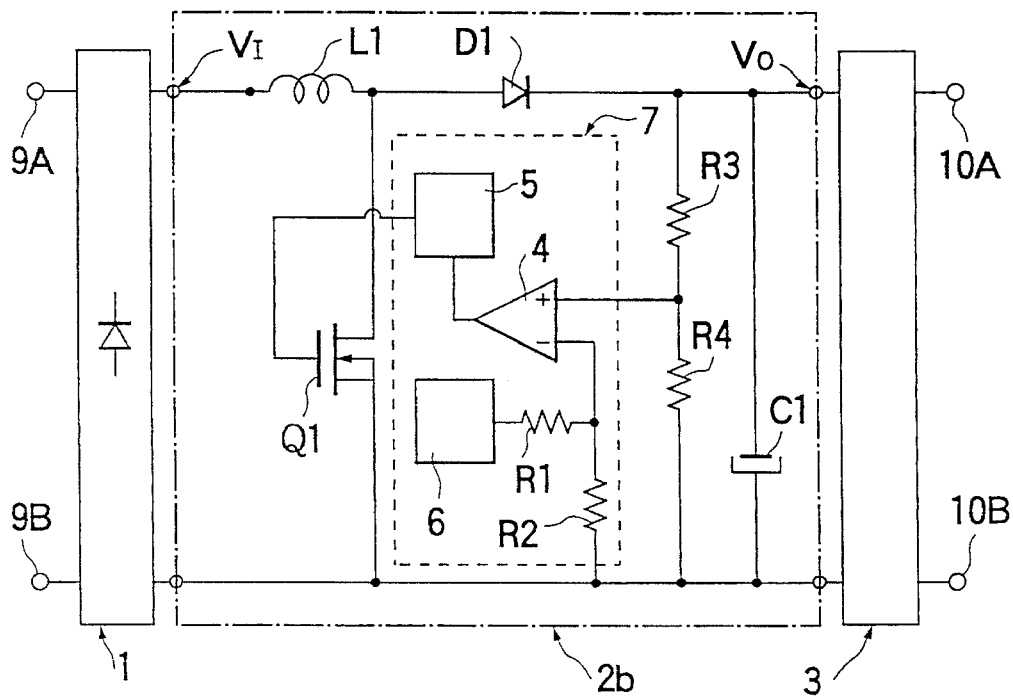
FIG. 4 illustrates a circuit for use in a conventional AC-DC converter having an improved power factor.
Figure 5:
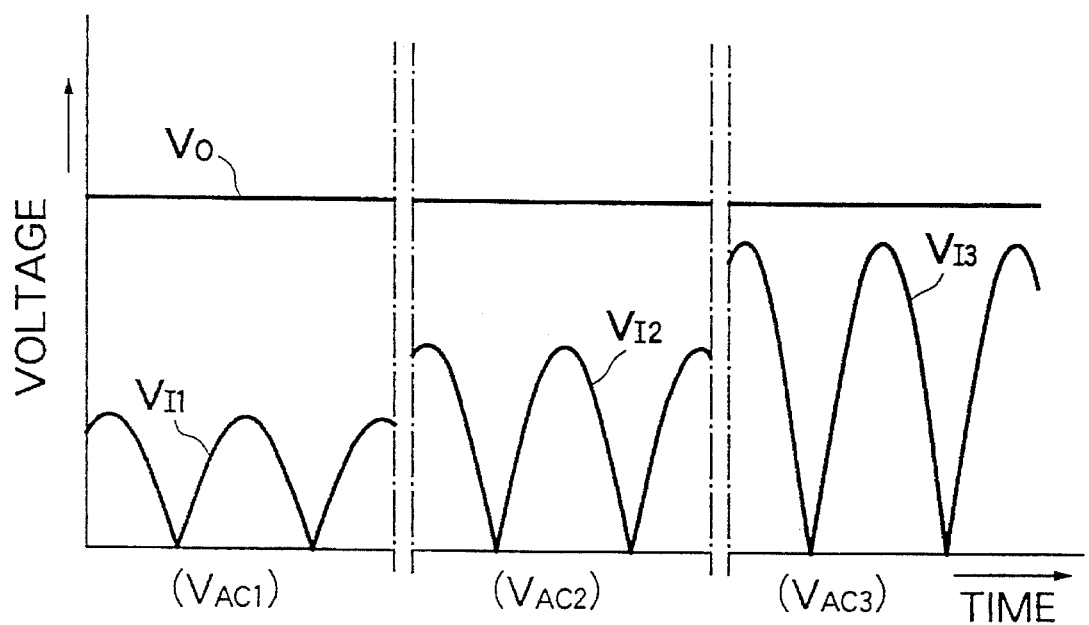
FIG. 5 illustrates waveform of input and output voltage to and from a booster converter circuit disposed in the circuit shown in FIG. 4.

The circuit structure of the AC-DC converter shown in FIG. 1 is the same as the circuit structure shown in FIG. 4 except for the circuit structure of the booster converter circuit 2a.

The booster converter circuit 2a has a circuit structured as follows.

The series circuit comprising the choke coil L1 and the diode D1 is connected to a position between the input terminal and the output terminal of the high potential side of the booster converter circuit 2a, the diode D1 making a direction from the choke coil L1 toward the output terminal to be the forward direction.

The main electric current passage of the switching transistor Q1 is connected to a position between the anode of the diode D1 and the low-potential-side line.

The output capacitor C1 is connected to the position between the cathode of the diode D1 and the low-potential-side line.

The series circuit comprising the resistors R3 and R4 is, in parallel, connected to the output capacitor C1.

The booster-converter control circuit 7 comprising the error amplifier 4, the pulse-width modulation circuit 5, the reference voltage circuit 6, the resistors R1 and R2 is connected to a position between the voltage dividing point of the resistors R3 and R4 and the gate of the switching transistor Q1 so that the terminal voltage of the output capacitor C1 is controlled.

The booster-converter control circuit 7 is structured as follows.

The series circuit comprising the resistors R1 and R2 is connected to a position between the output terminal of the reference voltage circuit 6 and the low-potential-side line. The voltage dividing point of the resistors R1 and R2 is connected to the negative-side input terminal of the error amplifier 4.

The voltage dividing point of the resistors R3 and R4 is connected to the positive-side input terminal of the error amplifier 4.

The output terminal of the error amplifier 4 is connected to the pulse-width modulation circuit 5, and the output terminal of the pulse-width modulation circuit 5 is connected to the gate of the switching transistor Q1.

A constant-current terminal of a constant-current circuit 8a is connected to the voltage dividing point of the resistors R3 and R4. A control voltage input terminal of the constant-current circuit 8a is connected to the input terminal of the booster converter circuit 2a connected to the output terminal of the rectifying circuit 1.

The constant-current circuit 8a is structured as follows.

The collector of an NPN-type transistor Q2 serving as a constant-current terminal of the constant-current Circuit 8a is connected to the voltage dividing point of the resistors R3 and R4. The emitter of the same is connected to the low-potential-side line while interposing a resister R7. A capacitor C2 is connected to a position between the base of the transistor Q2 and the low-potential-side line.

A series circuit comprising resistors R5 and R6 is connected to a position between input terminals of the booster converter circuit 2a connected to the output terminal of the rectifying circuit 1. The connection point between the resistors R5 and R6 is connected to the base of the transistor Q2.

The waveform of the input and output voltage to and from the booster converter circuit 2a structured as described above is as shown in FIG. 2.

Figure 2:
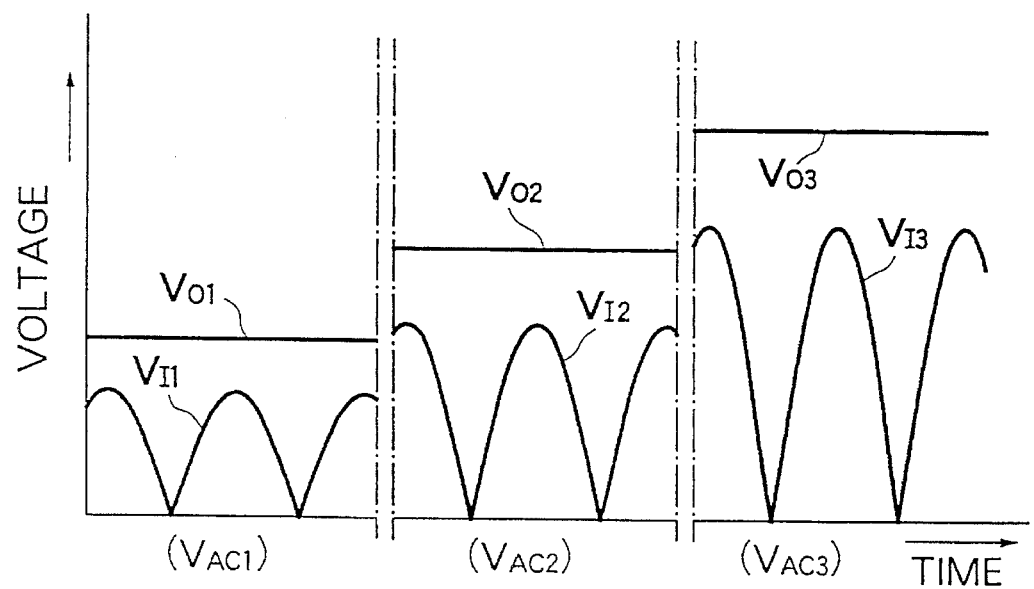
FIG. 2 illustrates waveform of input and output voltage to and from a booster converter circuit disposed in the circuit shown in FIG. 1.

Referring to FIG. 2, VAC1, VAC2 and VAC3 are AC voltages having different levels, the AC voltages VAC1, VAC2 and VAC3 being received by the AC-DC converter. $V_{I1}$, $V_{I2}$ and $V_{I3}$ and $V_{O1}$, $V_{O2}$ and $V_{O3}$ respectively are input voltages and output voltages of the booster converter circuit 2a.

The operation of the circuit shown in FIG. 1 will now be described with reference to FIG. 2.

When low-level AC voltage (VAC1) is received by the AC-DC converter, the voltage $V_{I1}$ received by the booster converter circuit 2a is pulsating voltage having a low peak voltage level. If the level of the input voltage $V_{I1}$ is low, the divided voltage to be supplied to the base of the transistor Q2 of the constant-current circuit 8a and realized by the resistors R5 and R6 is lowered. Therefore, the voltage at both ends of the resistor R7 is also low, and accordingly, an electric current introduced into the collector of the transistor Q2 and passed through the resistor R7, that is, an electric current passed from the voltage dividing point of the resistors R3 and R4 to the constant-current circuit 8a is small.

The output voltage $V_{O1}$ is the terminal voltage of the output capacitor C1 and as well as the voltage at the both ends of the series circuit comprising the resistors R3 and R4. Although the voltage at the both ends of the resistor R3 is raised due to the presence of the electric current introduced into the constant-current circuit 8a, the degree of the rise of the voltage of the resistor R3 is restricted because the introduced current is small.

Since the error amplifier 4 is so operated as to make the supplied voltage at the voltage dividing point of the resistors R3 and R4 to be the same as the reference divided voltage at the voltage dividing point of the resistors R1 and R2, the error amplifier 4 causes the voltage at the both ends of the resistor R4 to be constant.

As a result, the degree of rise of the voltage at the both ends of the series circuit comprising the resistors R3 and R4, that is, the rise of the voltage at the both ends of the output capacitor C1, is so small as to lower the output voltage $V_{O1}$.

However, the resistance value of the resistor R3 shown in FIG. 1 is determined to be sufficiently low as compared with that of the resistor R3 of the circuit shown in FIG. 4.

When high-level AC voltage ($V_{AC2}$) is received by the AC-DC converter, the voltage $V_{I2}$ received by the booster converter circuit 2a is pulsating voltage having a high peak voltage level. If the level of the input voltage $V_{I2}$ is high, the divided voltage to be supplied to the base of the transistor Q2 of the constant-current circuit 8a and realized by the resistors R5 and R6 is raised. Therefore, an electric current introduced from the voltage dividing point of the resistors R3 and R4 into the constant-current circuit 8a is enlarged.

Therefore, the voltage at the both ends of the resistor R3 is considerably raised, causing the level of the voltage at both ends of the output capacitor C1 to be raised. Further, the level of the output voltage $V_{O2}$ is raised.

If higher AC voltage ($V_{AC3}$) is supplied to the AC-DC converter, also the level of the output voltage $V_{O3}$ is raised as compared to the output voltage $V_{O2}$ realized when the supplied AC voltage is $V_{AC2}$.

As a result, the circuit shown in FIG. 1 is able to restrict the level of the output voltage $V_O$ from the booster converter circuit 2a when a low-level AC voltage is supplied to the AC-DC converter. If a high-level AC voltage is supplied, the circuit is able to raise the output voltage $V_O$.

Further, the circuit can be so designed that the input voltage $V_I$ received by the booster converter circuit 2a is made in proportion to the output voltage $V_O$ of the same by adequately setting the resistors R3, R4, R5, R6 and R7.

If the circuit is designed in such a manner that the input voltage $V_I$ is in proportion to the output voltage $V_O$, foregoing Equation (1) is made to the following Equation (2):

$$P = (V_O - V_I)I_O \qquad (2)$$
$$= (V_O - V_O/k)I_O$$
$$= (1 - 1/k)V_O I_O$$

where k is a voltage boosting ratio ($V_O/V_I$) and $V_O I_O$ is the input power to be received by the ensuing DC-DC converter circuit 3.

As can be understood from Equation (2), the stored converted-electric power P of the booster converter circuit 2a is determined depending upon only the input power to be received by the ensuing DC-DC converter circuit 3 regardless of the input voltage $V_I$. Therefore, enlargement of the load to be borne by the components of the booster converter circuit 2a of the AC-DC converter shown in FIG. 1 in comparison with that of the conventional AC-DC converter of the type having the improved power factor shown in FIG. 4 can be prevented.

Figure 3:
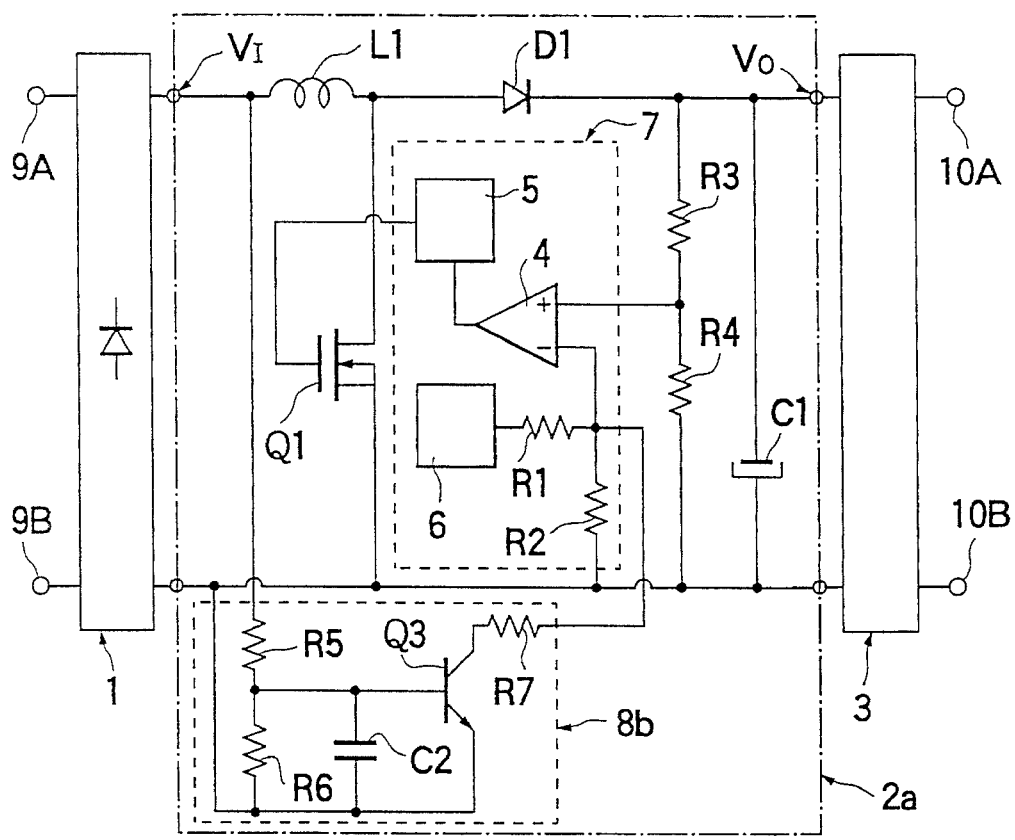
FIG. 3 illustrates a circuit for use in an AC-DC converter according to another embodiment of the present invention.

FIG. 3 illustrates another embodiment of the present invention, wherein the same elements as those shown in FIG. 1 are given the same reference numerals.

This embodiment differs from the embodiment shown in FIG. 1 in the voltage dividing point to which the constant-current circuit 8b is connected and in the circuit structure while having the residual structure that is the same as that of the embodiment shown in FIG. 1.

As contrasted with the structure shown in FIG. 1 in which the end of the constant current flow of the constant-current circuit 8a is connected to the voltage dividing point of the resistors R3 and R4 connected in parallel to the output capacitor C1, the end of the constant current flow of the constant-current circuit 8b shown in FIG. 3 is connected to the voltage dividing point of the resistors R1 and R2 connected to the reference voltage circuit 6.

The input terminal of the control voltage is, similar to that shown in FIG. 1, connected to the input terminal of the booster converter circuit 2a connected to the output terminal of the rectifying circuit 1.

The structure of the constant-current circuit 8b is arranged as follows.

An end of the resistor R7 is connected to the voltage dividing point of the resistors R1 and R2, another end of the resistor R7 and the emitter of a PNP transistor Q3 are connected to each other, and the collector of the same is connected to the low-potential-side line. The capacitor C2 is connected to a position between the base of the transistor Q3 and the low-potential-side line.

The series circuit comprising the resistors R5 and R6 is connected to the position between the input terminals of the booster converter circuit 2a connected to the output terminal of the rectifying circuit 1. The voltage dividing point between the resistors R5 and R6 is connected to the base of the transistor Q3.

The operation of the circuit structured as described above and shown in FIG. 3 is as follows.

When low-level AC voltage ($V_{AC1}$) is received by the AC-DC converter, the voltage $V_{I1}$ received by the booster converter circuit 2a is pulsating voltage having a low voltage level.

If the level of the input voltage $V_{I1}$ is low, the potential difference of the base of the transistor Q3 of the constant-current circuit 8b is low, and therefore, the electric current introduced from a voltage dividing point of the resistors R1 and R2 into the constant-current circuit 8b is enlarged.

If the electric current introduced into the constant-current circuit 8b is enlarged, the voltage drop in the resistor R1 is enlarged relatively but the voltage drop in the resistor R2 is made small.

Therefore, the reference division voltage level at the voltage dividing point of the resistors R1 and R2 received by the negative terminal of the error amplifier 4 is lowered, causing the output voltage $V_{O1}$ from the booster circuit 2a to be restricted to a low level.

When high-level AC voltage (VAC3) is received by the AC-DC converter, the voltage V13 received by the booster converter circuit 2a is pulsating voltage having a high voltage level.

If the level of the input voltage VAC3 is high, the potential difference in the base of the transistor Q3 of the constant-current circuit 8b is high, causing the electric current to be introduced into the constant-current circuit 8b to be made small.

If the current to be introduced into the constant-current circuit 8b is small, the increase in the voltage drop of the resistor R1 is restricted and the reference voltage dividing level at the voltage dividing point of the resistors R1 and R2 to be supplied to the negative terminal of the error amplifier 4 is high. Therefore, the output voltage V03 from the booster converter circuit 2a is raised.

As described above, the circuit shown in FIG. 3 is able to restrict the level of the output voltage V0 from the booster converter circuit 2a when a low-level AC voltage is supplied to the AC-DC converter. If a high-level AC voltage is supplied, the circuit is able to raise the output voltage V0. The circuit performs a similar operation as that performed by the circuit shown in FIG. 1 such that the same waveform of the input and output voltage to and from the booster converter 2a as that shown in FIG. 2 is attained.

Further, the circuit can be so designed that the input voltage V1 received by the booster converter circuit 2a is made in proportion to the output voltage V0 of the same by adequately setting the resistors R1, R2, R5, R6 and R7. The stored converted-power P of the booster converter circuit 2a can be expressed by Equation (2).

Therefore, the stored converted-electric power P of the booster converter circuit 2a is made regardless of the input voltage V1. Therefore, enlargement of the load to be borne by the components of the booster converter circuit 2a can be prevented.

As described above, the present invention is characterized in the AC-DC converter having the rectifying circuit to be connected to the commercial power supply line, the AC-DC converter having the circuit arranged in such a manner that the constant-current circuit is connected to the voltage dividing point of the charge voltage of the output capacitor to be connected to the input terminal of the error amplifier of the booster converter control circuit and realized by a plurality of resistors or the voltage dividing point of the reference voltage to be connected to the input terminal of the error amplifier and realized by the plural resistors, the constant-current circuit being connected in parallel to the resistors, wherein control of the constant-current value of the constant-current circuit is performed with the rectified output voltage from the rectifying circuit.

As a result, the converted power to be stored in the booster converter circuit is determined regardless of the input voltage, and accordingly, the enlargement of the loads to be borne by the circuit components of the booster converter due to input voltage can be prevented. As a result, the size and cost of the AC-DC converter are reduced.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An AC-DC converter of a type having an improved power factor including a rectifying circuit for rectifying an AC input supplied from a commercial power supply line, a booster converter circuit that raises the level of rectified voltage from aid rectifying circuit to obtain DC voltage higher than the peak value of the rectified output voltage at the both ends of an output capacitor thereof and a DC-DC converter circuit that converts the voltage obtained at said output capacitor of said booster converter circuit into a stabilized output to supply said stabilized output to an external load, said AC-DC converter comprising:

an error amplifier that subjects a voltage corresponding to the output voltage between terminals of said output capacitor and voltage corresponding to reference voltage to a comparison to transmit a signal for maintaining the voltage between said terminals of said output capacitor at a constant level; and means including a constant-current circuit disposed between an input terminal of said error amplifier and a low-potential-side line of said booster converter circuit for changing the voltage corresponding to the output voltage of said output capacitor, wherein control of a constant-current value of said constant-current circuit is performed with said rectified output voltage from said rectifying circuit.

2. An AC-DC converter of a type having an improved power factor including a rectifying circuit for rectifying an AC input supplied from a commercial power supply line, a booster converter circuit that raises the level of rectified voltage from said rectifying circuit to obtain DC voltage higher than the peak value of said rectified output voltage at the both ends of an output capacitor thereof and a DC-DC converter circuit that converts the voltage obtained at said output capacitor of said booster converter circuit into a stabilized output to supply said stabilized output to an external load, said AC-DC converter comprising:

an input terminal of an error amplifier of a booster converter control circuit, said input terminal being connected to a voltage dividing point of a plurality of resistors by which a terminal voltage of said output capacitor is divided; and means including a constant-current circuit connected to said voltage dividing point so that said constant-current circuit is connected in parallel with at least one of said plurality of resistors for changing a voltage corresponding to the output voltage of said output capacitor, wherein control of a constant-current value of said constant-current control circuit is performed with said rectified output voltage from said rectifying circuit.

* * * * *

UNITED STATES PATENT AND TRADEMARK OFFICE
CERTIFICATE OF CORRECTION

PATENT NO. : 5,489,837

DATED : February 6, 1996

INVENTOR(S) : Koji Arakawa

It is certified that error appears in the above-indentified patent and that said Letters Patent is hereby corrected as shown below:

In Column 7, line 5, "VAC3" should be --V13--.

Signed and Sealed this

Second Day of July, 1996

Attest:

BRUCE LEHMAN

*Attesting Officer*  *Commissioner of Patents and Trademarks*